Nov. 25, 1969  A. E. PETERSON  3,480,290
COLLAPSIBLE BABY STROLLER
Filed May 29, 1967  2 Sheets-Sheet 1
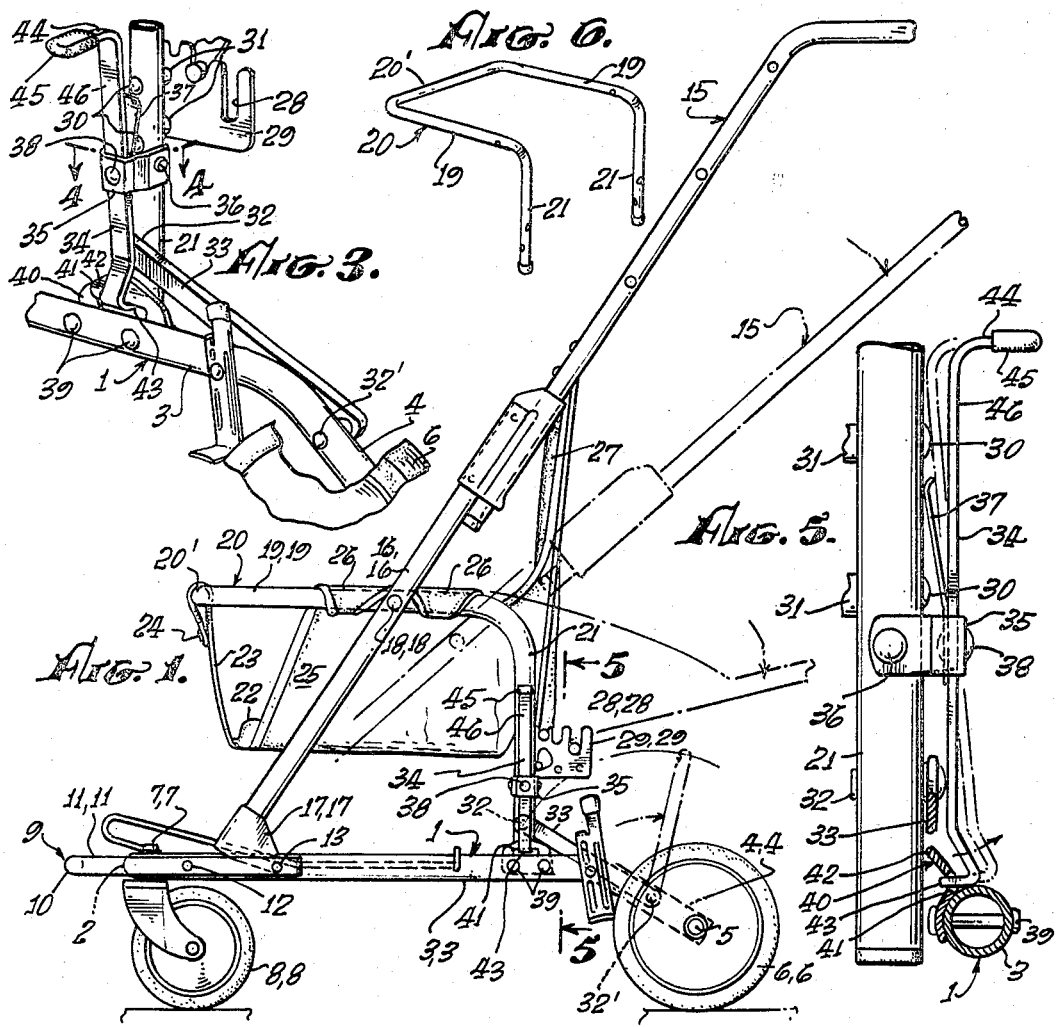
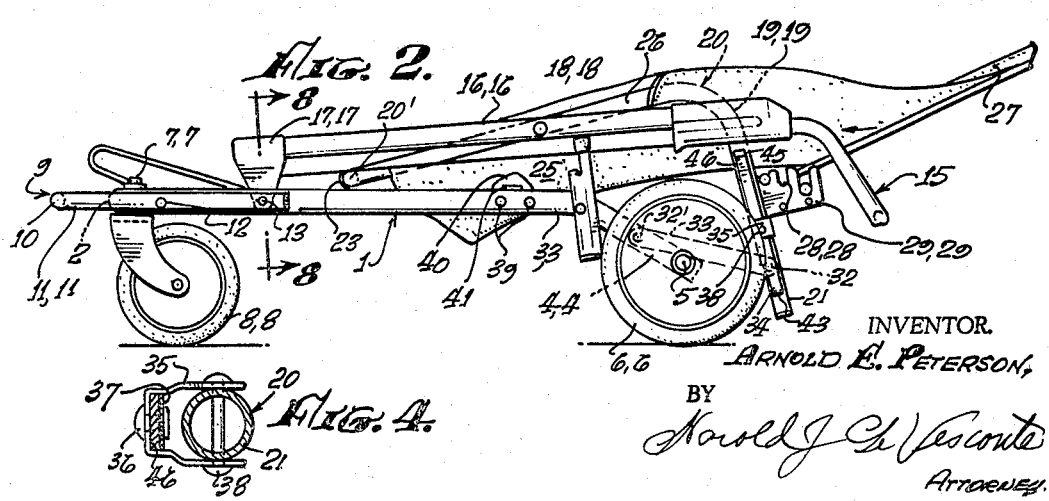
INVENTOR.
ARNOLD E. PETERSON,
BY
Harold J. Ch. Vesconte
ATTORNEY.

Nov. 25, 1969  A. E. PETERSON  3,480,290
COLLAPSIBLE BABY STROLLER
Filed May 29, 1967  2 Sheets-Sheet 2
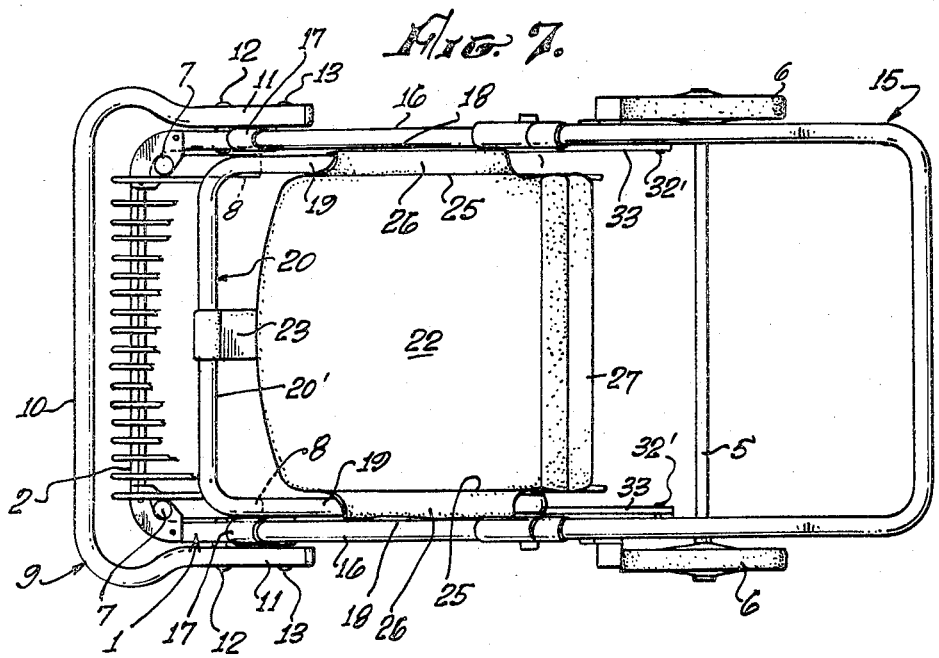
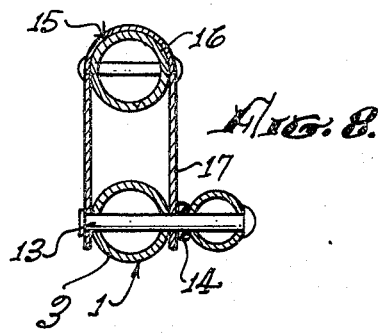
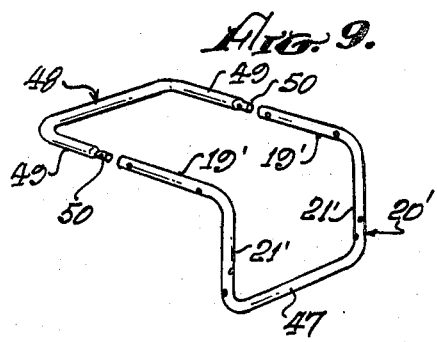
ARNOLD E. PETERSON,
INVENTOR.
BY
Harold J. DeVesante
ATTORNEY.

United States Patent Office 3,480,290
Patented Nov. 25, 1969

3,480,290
COLLAPSIBLE BABY STROLLER
Arnold E. Peterson, Glendale, Calif., assignor to A. E. Peterson Mfg. Co., Glendale, Calif., a corporation of California
Filed May 29, 1967, Ser. No. 641,952
Int. Cl. B62b 3/02, 7/10
U.S. Cl. 280—36    4 Claims

ABSTRACT OF THE DISCLOSURE

A stroller type vehicle including a collapsible frame structure characterized by a rigid base frame to which the wheels are attached and a collapsible seat supporting frame movably mounted on the base frame by pivotal connection to the side members of the handle means and to a pair of lazy bar links pivotally connected both to the base frame and to the seat supporting frame and on which a pair of manually releasable, self-engaging latch means operates automatically to secure the stroller in erected position.

BACKGROUND OF THE INVENTION

Field of the invention

The field of the invention is that of collapsible wheeled vehicles such as found in Class 280–36.

Description of the prior art

Heretofore in the art of folding strollers of the general character of the present invention, the collapse or folding of the stroller places the right angled seat supporting frame down entirely on the top of the base frame structure.

SUMMARY OF THE INVENTION

The present invention has for its principal objective the provision of a stroller frame structure including a rigid base frame structure on which the front and rear wheels are mounted and on which frame structure the seat and the supporting frame therefor including the stroller handle are relatively movable between an erected and collapsed position in which the seat overhangs the base frame by means including a pair of lazy bar links pivoted to the base frame structure and to a portion of the seat supporting frame together with a manually releasable, self-locking means automatically securing the stroller frame structure in erected position.

BRIEF DESCRIPTION OF THE DRAWINGS

In the attached drawings:

FIG. 1 is a side elevational view of a stroller constituting a presently preferred embodiment of the invention, the stroller being shown in erected position, FIG. 2 is a side elevational view of the stroller in collapsed position, FIG. 3 is an enlarged scale, fragmentary, perspective view of one of the locking means for holding the stroller in erected position, FIG. 4 is a further enlarged sectional view taken on the line 4—4 of FIG. 3, FIG. 5 is a fragmentary sectional view on substantially the same scale as FIG. 4 taken in the vertical plane containing the line 5—5 of FIG. 1 but at the side remote from the side shown in FIG. 1, FIG. 6 is a perspective view of a seat supporting component having a closed, integral front horizontal bar component, FIG. 7 is a top plan view of the stroller in erected position, FIG. 8 is a fragmentary sectional view taken on the line 8—8 of FIG. 2, and FIG. 9 is a perspective view of an alternative seat supporting component having a removable front horizontal bar.

DETAILED DESCRIPTION OF THE INVENTION

The presently preferred embodiment of the invention shown in the drawings comprises a base frame member 1 formed of tubing bent into U-shaped configuration and comprising a horizontal front portion 2 and spaced parallel rearwardly extending side portions 3, 3 which at their rear ends are bent diagonally downwardly as at 4, 4. An axle rod 5 extends through said ends and supports a pair of rear wheels 6, 6. Bolts 7, 7 secure a pair of freely dirigible casters 8, 8 at the frame corners formed by the portions 2 and 3 of the frame. The front end of the frame includes a bumper member 9 also formed of tubing including a front member 10 disposed in parallel spaced relation forwardly of the frame portion 2 and side portions 11, 11 extending parallel to the frame side portions 3, 3 and secured in outwardly spaced relation thereon by rivets 12 and 13 and interposed spacer members 14.

A U-shaped handle means 15 includes collapsible side members 16, 16 terminating in laterally extending bracket arms 17, 17 which at their free ends are interposed between the frame bumper side portions 3 and 11 and are pivotally mounted on the rivets 13, 13 and, incidentally, serving as a portion of the spacer means associated with those rivets. Above the said pivotal mounting, the handle means is pivotally connected by rivets 18, 18 to the outer faces of the arm rest members 19, 19 of a seat supporting frame 20.

The seat supporting frame 20 is shown in perspective in FIG. 6 and comprises a length of appropriately bent metal tubing including a front bar portion 20' from which the arm rest portions 19, 19 extend in spaced parallel relation past the rivets 18, 18 and thence the side portions extend at right angles to the side portions in leg portions 21, 21 which are of such length (see FIG. 1) that when the stroller is in erected position, they terminate at the horizontal plane of the frame members 3, 3. The seat supporting frame supports a cushion means 22 by a releasable front strap 23 surrounding the front bar 20' and closed by a snap means 24 and also by side walls 25 having tab portions 26 preferably detachably secured to the arm rest portions 19, 19 by snap devices 26. The seat supporting frame additionally supports an adjustably reclinable back 27 by laterally projecting studs having selective engagement with notches 28 in back supporting members 29 fixed to and projecting rearwardly from the leg portions 21, 21, said members 29 being secured by rivets 30 and interposed spacers 31.

The connections between the seat supporting frame and the base frame whereby the stroller is moved between its collapsed and erected positions are mirror image duplicates, wherefore, a description of the means at one side thereof will serve for both. About midway between the end of the leg member 21 and the adjacent one of the rivets 30, a rivet 32 disposed parallel to the rivets 30 pivotally secures one end of a lazy bar link 33 to the associated leg portion 21 and a second rivet 32' similarly secures the opposite end of the link 33 to the inner side face of the diagonally extending end portion 4 of the associated side member 3, it being noted that the lateral width of the seat supporting member 20 is such as to afford the necessary operating clearance for the link. The latching means comprises a latch bar 34 extending parallel to the outer face of the leg portion 21 and carrying a yoke member 35 fixed to the latch bar 34 at the midlength thereof. The arms of the yoke member straddle the associated leg portion 21 and a rivet 36 extending through the yoke arms and the leg member pivotally mounts the latch bar on the leg portion, the yoke being so shaped as to position the latch bar outwardly from the leg portion which both affords clearance for the link 33 and for the rocking movement of the latch bar 34 about the rivet 36. A leaf spring 37 having one end thereof fixed to the bar 34 and yoke 35 by the rivet 38, which also secures the yoke to the latch bar, has an upwardly extending free end bearing against the side of the leg portion 21 and urging the latch bar and yoke as a unit in a clockwise direction as viewed in FIG. 5.

Fixed to the inner surface of the associated base frame side member 3 by rivets 39, 39 is a latch engaging member 40 having a horizontally extending slot 41 extending therethrough in alignment with the top surface of the frame side member, the portion 42 of said latch engaging member above the slot being inclined upwardly and inwardly to act as a strike plate for the momentary displacement of the inturned detent 43 formed on the lower end of the latch bar, said detent including a portion extending laterally outwardly sufficiently to rest on the upper surface of the frame member 3 as best shown in FIG. 5 constituting means affording support for the seat against swinging movement about the pivotal connections to the handle. The upper end of the latch bar 34 terminates in an outturned handle portion 46 preferably covered with a plastic tip 45.

Assuming that the stroller is in erected position as shown in FIG. 1, and that it is desired to collapse it, the user presses inwardly on the upper ends of the two latch bars 34 which disengages the detents 43 from their respective slots 41, and at the same time the user pulls rearwardly on the latch members with the result that the lower end of the leg portions 43 swing about the arc described by the end of the link 33 about the rivet 32' until the link rests on the axle bar 5 as shown in FIG. 2 in which position, it has carried the leg portion 21 rearwardly to overhang the wheel and axle as shown in FIG. 2 and has accordingly permitted the handle 15 to be collapsed closely against the base frame 1, also as shown in FIG. 2. Due to the fact that the leg portion of the seat supporting frame has been carried completely in rear of the rear wheels and axle, the stroller is collapsed into a much more compact condition than has heretofore been possible. When it is desired to erect the stroller, it is necessary only to lift upwardly on the handle 15 to carry the seat supporting frame and the lazy bar 33 back to the position shown in FIG. 1 in which, as the lower end of the leg portions 21 follow the arc described by the outer end of the lazy bar 33 about the rivet 32' until the detents of the two latch bars engage the sloping strike plate surface of the member 40 and spring into locking position in the slot 41.

Finally referring to FIG. 9 there is shown a modified form of a seat supporting frame which can be used in place of the frame 20 for those strollers in which it is desired to have the front bar removable. In this modification, the lower ends of the leg portions 21', 21' are interconnected by an integrally formed crossbar portion 47 and the integrally formed front bar 20' is dispensed with and is replaced by a removable front bar member 48 having side portions 49, 49 which are in alignment with the arm rest portions 19', 19' and which are provided with reduced end portions 50, 50 having snap-in engagement with the front ends of the arm rest members 19', 19' and secured therein with any suitable latch means. In this form of the invention, the seat 22 would be attached in the same manner as in the first described embodiment of the invention.

Thus there has been disclosed the concept of a collapsible stroller characterized by simple construction and by ease of operation in being moved between its erected and collapsed positions together with rigidity deriving from the fact that all of the wheels are mounted on a unitary unarticulated portion of the frame.

I claim:

1. In a collapsible stroller, a base frame including spaced parallel side members extending from front to rear of the stroller, wheel means supporting said base frame, a handle means including spaced parallel members pivotally connected to one each of said side members adjacent the front ends thereof, a seat frame means including spaced parallel armrest portions pivotally connected to the adjacent ones of said handle side members, latch supporting leg portions extending from the rear ends of said armrest portions, a pair of manually releasable latch means mounted one each on each of said leg portions and each of said latch means including a latch bar terminating in an end portion positioned to engage the associated one of said base frame said members and operative, when so engaged, as the sole means supporting the stroller in erected position, each of said latch means further including a latch bar engaging strike plate carried by the associated frame side member and with which the associated latch bar is interlockingly engageable and operative when so engaged to prevent collapse of the stroller, and a pair of lazy bars each having one end thereof pivotally connected to one each of said leg portions and the opposite end thereof pivotally connected to the associated base frame side member and operative as an incident to collapse of said stroller to carry said leg portions beyond the rear of said base frame with said armrest portions disposed adjacent to and substantially parallel to said base frame.

2. A collapsible stroller as claimed in claim 1 in which each of said latch means includes a spring component providing a yielding bias operative to maintain the associated latch bar in locking position and in which each of strike plates includes an inclined surface operative incident to erection of the stroller to momentarily displace the associated latch bar preliminary to automatic interlocking engagement with the associated strike plate means.

3. A collapsible stroller as claimed in claim 1 in which said supporting wheel means for said base frame includes an axle extending between and supported by the rear ends of said base frame side members and a pair of wheels mounted on said axle disposed one each adjacent to the said rear ends of said base frame side members, and in which said axle additionally serves as a stop means for said lazy bars when the stroller is moved to its collapsed position.

4. A collapsible stroller as claimed in claim 1 in which each of said latch bars comprises a spring biased lever pivotally mounted on one each of said leg portions of said seat frame and extending parallel thereto and spaced therefrom sufficiently to afford clearance for movement of the end of the associated lazy bar therebetween incident to collapse and erection of the stroller.

References Cited

UNITED STATES PATENTS

| 2,818,270 | 12/1957 | Cataline | 280—43.17 |
| 2,880,011 | 3/1959 | Peterson | 280—36 |
| 3,075,783 | 1/1963 | Flam | 280—36 |
| 3,084,949 | 4/1963 | Forster et al. | 280—36 |
| 3,184,249 | 5/1965 | Shone | 280—36 |

BENJAMIN HERSH, Primary Examiner
JOEL E. SIEGEL, Assistant Examiner